(12) United States Patent
Ritzmann et al.

(10) Patent No.: US 10,648,329 B2
(45) Date of Patent: May 12, 2020

(54) ESTIMATION OF FRACTURE PROPERTIES BASED ON BOREHOLE FLUID DATA AND ACOUSTIC IMAGING

(71) Applicants: Nicklas Ritzmann, Celle (DE); Frank Walles, The Woodlands, TX (US); Alex Bruns, Conroe, TX (US); David Gadzhimirzaev, Houston, TX (US); Sergey Kotov, Houston, TX (US)

(72) Inventors: Nicklas Ritzmann, Celle (DE); Frank Walles, The Woodlands, TX (US); Alex Bruns, Conroe, TX (US); David Gadzhimirzaev, Houston, TX (US); Sergey Kotov, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 188 days.

(21) Appl. No.: 15/483,386

(22) Filed: Apr. 10, 2017

(65) Prior Publication Data

US 2018/0291734 A1 Oct. 11, 2018

(51) Int. Cl.
| | | |
|---|---|---|
| *E21B 49/08* | (2006.01) | |
| *G01V 1/28* | (2006.01) | |
| *E21B 43/26* | (2006.01) | |
| *G01V 1/42* | (2006.01) | |

(52) U.S. Cl.
CPC .......... *E21B 49/087* (2013.01); *E21B 43/26* (2013.01); *G01V 1/284* (2013.01); *G01V 1/42* (2013.01); *G01V 2210/6246* (2013.01); *G01V 2210/646* (2013.01); *G01V 2210/74* (2013.01)

(58) Field of Classification Search
CPC .......... E21B 43/25; E21B 47/12; E21B 49/00; E21B 49/005; E21B 49/087
See application file for complete search history.

(56) References Cited

U.S. PATENT DOCUMENTS

| | | | |
|---|---|---|---|
| 2008/0133193 A1 | 6/2008 | Gdanski et al. | |
| 2013/0233537 A1* | 9/2013 | McEwen-King | ....... E21B 43/26 166/250.1 |
| 2015/0013974 A1* | 1/2015 | Mekic | ................... E21B 47/101 166/254.1 |

(Continued)

OTHER PUBLICATIONS

International Search Report; International Application No. PCT/US2018/026442; dated Jul. 26, 2018, 3 pages.

(Continued)

*Primary Examiner* — Caroline N Butcher
(74) *Attorney, Agent, or Firm* — Cantor Colburn LLP (57) ABSTRACT

A method of estimating one or more properties of an earth formation includes acquiring formation fluid data indicative of a qualitative property of a formation fluid in a near-field region of an earth formation surrounding a borehole, the near field region including a surface of the borehole, and acquiring acoustic data based on acoustic signals transmitted into a far-field region of the formation, and estimating a property of one or more fractures in the far-field region based on the acoustic data. The method also includes combining the formation fluid data and the acoustic data, and estimating, by a processing device, at least one fracture characteristic of the formation in the near-field region and the far-field region based on the combined data.

20 Claims, 6 Drawing Sheets

(56) References Cited

U.S. PATENT DOCUMENTS

| | | | | |
|---|---|---|---|---|
| 2015/0109886 A1* | 4/2015 | Mekic | ...................... | G01V 1/44 |
| | | | | 367/25 |
| 2016/0363684 A1* | 12/2016 | Patterson | .......... | E21B 47/02208 |
| 2018/0016896 A1* | 1/2018 | Tang | .................... | E21B 21/063 |

OTHER PUBLICATIONS

Written Opinion of the International Search Report; International Application No. PCT/US2018/026442; dated Jul. 26, 2018, 6 pages.

* cited by examiner

ESTIMATION OF FRACTURE PROPERTIES BASED ON BOREHOLE FLUID DATA AND ACOUSTIC IMAGING

BACKGROUND

Geologic formations below the surface of the earth may contain reservoirs of oil and gas, which are retrieved by drilling one or more boreholes into the subsurface of the earth. The boreholes are also used to measure various properties of the boreholes and the surrounding subsurface formations.

Unconventional formations are increasing employed for gas and oil exploration and production. Unconventional formations are typically low permeability formations that often require hydraulic fracturing or other techniques to stimulation hydrocarbon production. In order to increase production rates and efficiencies, it is important to acquire accurate information regarding formation properties so that areas of the formation most conducive to stimulation and production are identified.

SUMMARY

An embodiment of a method of estimating one or more properties of an earth formation includes acquiring formation fluid data indicative of a qualitative property of a formation fluid in a near-field region of an earth formation surrounding a borehole, the near field region including a surface of the borehole, and acquiring acoustic data based on acoustic signals transmitted into a far-field region of the formation, and estimating a property of one or more fractures in the far-field region based on the acoustic data. The method also includes combining the formation fluid data and the acoustic data, and estimating, by a processing device, at least one fracture characteristic of the formation in the near-field region and the far-field region based on the combined data.

An embodiment of a system for estimating one or more properties of an earth formation includes at least one acquisition unit configured to acquire formation fluid data and acoustic data, the formation fluid data indicative of a qualitative property of a formation fluid in a near-field region of an earth formation surrounding a borehole, the near field region including a surface of the borehole, the acoustic data based on acoustic signals transmitted into a far-field region of the formation. The system also includes a processing device configured to perform estimating a property of one or more fractures in the far-field region based on the acoustic data, combining the formation fluid data and the acoustic data, and estimating at least one fracture characteristic of the formation in the near-field region and the far-field region based on the combined data.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are provided for estimating properties and characteristics of earth formations, including properties of fractures and/or fracture networks, based on acoustic measurement or imaging data and quantitative formation fluid measurement data. In one embodiment, properties of one or more fractures in a far-field region of a formation surrounding a borehole are estimated based on acoustic measurement data, such as deep shear wave imaging (DSWI) data, and borehole fluid properties are used to estimate one or more fracture properties in a near-field region (e.g., whether there are fractures in the near-field, properties of such fractures, connectivity between the far-field fractures and the borehole, and others). The acoustic measurement data and the formation fluid measurement data may be combined to provide an assessment of properties of a fracture network in both the near-field and far-field, which can be used to evaluate sections of the formation along the borehole and identify sections that are conducive to stimulation and/or production.

In one embodiment, a method of estimating fracture properties of a formation includes acquiring DSWI data and estimating far-field fracture properties, such as the extent, orientation and/or density of critically stressed fractures in the far-field region. The method also includes acquiring formation fluid measurement data (e.g., fluid log or mud log data, fluid sample data, etc.) and estimating near-field fracture properties such as whether there are critically stressed fractures in the near-field and intersecting a borehole, the extent and/or density of near-field fractures, and connectivity between far-field fractures and the borehole. Estimating near-field fracture properties may also include identifying fluids and determining whether the near-field and/or far-field fractures are hydrocarbon bearing or water bearing. The method provides information regarding properties of a fracture network in both the near-field and far-field around a borehole, which may include knowledge of whether open to partially open critically stressed fracture systems occur only within a near-field borehole environment, or whether such fracture systems are potentially connected to far-field fracture systems. Various energy industry operations, including stimulation and production operations, can be planned and/or adjusted based on this knowledge, and more effectively targeted.

Embodiments described herein are applicable to conventional formations and unconventional formations such as shale formations, oil sands, tight gas sands, fractured formation and shale formations. For example, embodiments are applicable to deviated and/or horizontal borehole sections in unconventional formations such as shale layers.

Figure 1:
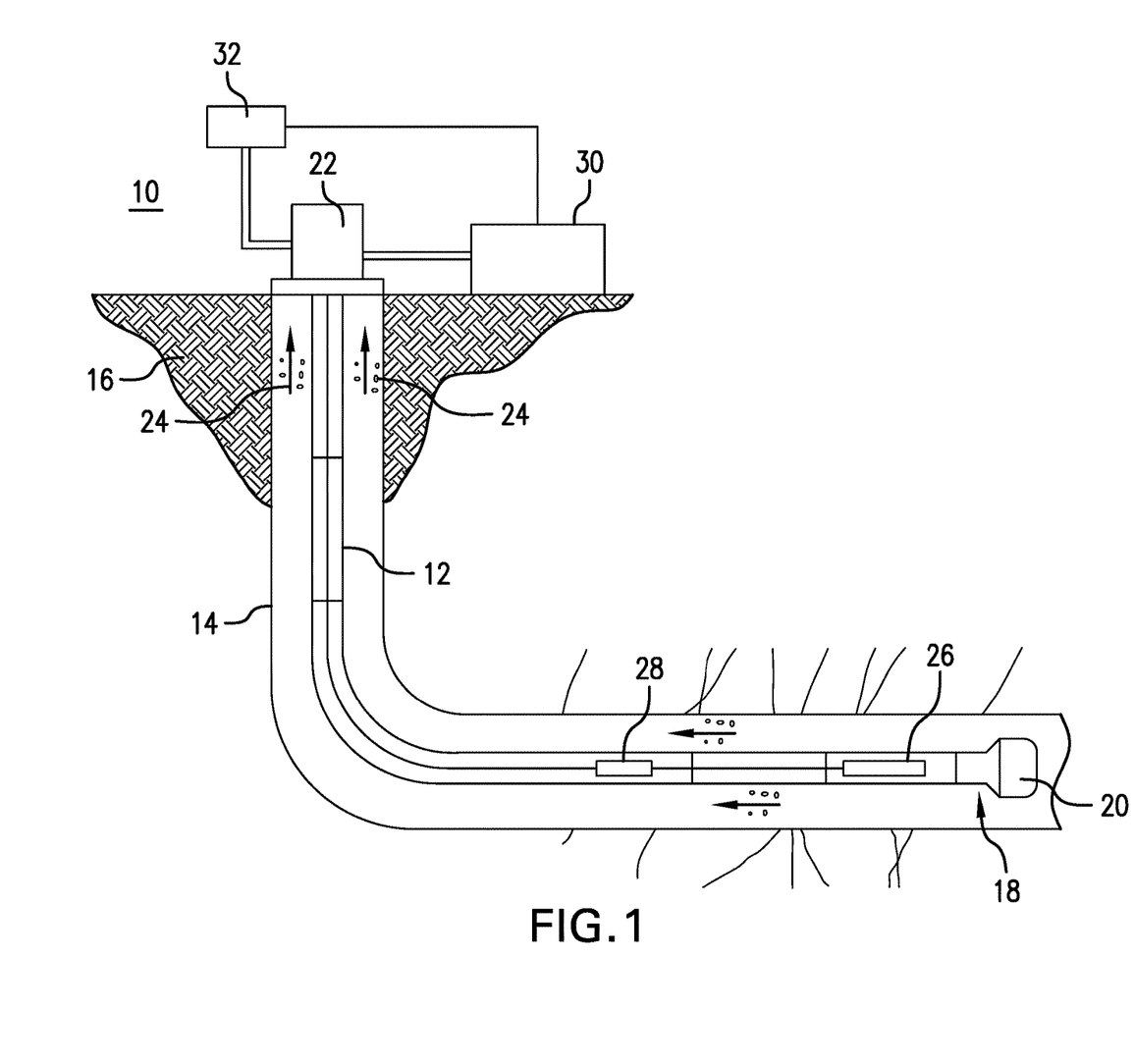
FIG. 1 depicts an embodiment of a hydrocarbon exploration and/or production system, which includes drilling and measurement assemblies.
Figure 2:
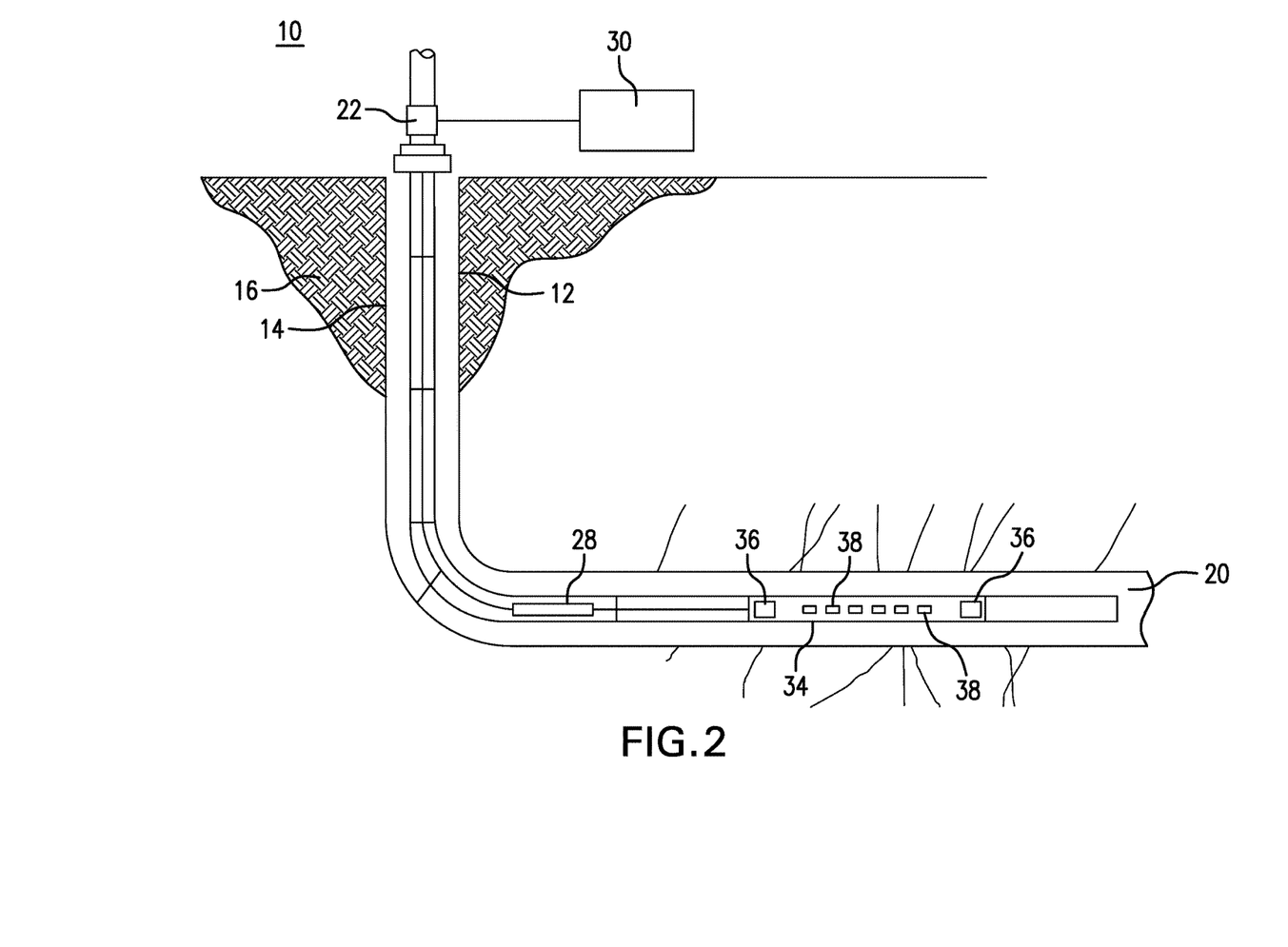
FIG. 2 depicts an embodiment of the system of claim 1 configured for acoustic measurements of a formation.

FIGS. 1 and 2 illustrate embodiments of a system 10 for performing energy industry operations such as formation measurement and/or evaluation, hydrocarbon production, completion and stimulation. The system 10 may be used to acquire formation fluid measurement data, acquire acoustic measurement data, and/or evaluate a formation according to embodiments described herein.

The system 10 includes a borehole string 12 such as a pipe string, coiled tubing, wireline or other carrier disposed within a borehole 14 that extends through an earth formation 16 and is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

The borehole 14 in these embodiments includes a vertical or near vertical section and a horizontal section that extends through a region of interest, such as a hydrocarbon resource (e.g., a shale layer or region) or a region in which a hydrocarbon resource is thought to exist. It is noted that although the embodiments described herein are described in conjunction with horizontal boreholes, they are not so limited, as they could be used with vertical, deviated, horizontal and any other boreholes having any selected path through a formation.

Referring to FIG. 1, in one embodiment, the system 10 is configured for performing a drilling and/or measurement operation. The borehole string 12 is a drillstring including one or more drill pipe sections, and is connected to a drilling assembly 18 that includes a drill bit 20. The system 10 also includes a surface structure or surface equipment 22 that includes or is connected to various components such as a wellhead, derrick and/or rotary table for supporting the borehole string, rotating the borehole string and lowering string sections or other downhole components. The surface equipment 22 also includes pumps, fluid sources and other components to circulate drilling fluid (e.g., mud) through the drilling assembly 18 and the borehole 14. Although the drillstring and the drill bit are shown in FIG. 1 as being rotated by a surface rotary device, the drill bit may be rotated by a downhole motor such as a mud motor.

During drilling, fluid such as drilling mud is circulated from a mud pit or other fluid source into the borehole 14, and is pumped through a conduit such an interior bore of the borehole string 12 and exits the borehole string 12 at the drill bit 20. The drilling mud then travels upward from the drill bit 20 through an annulus of the borehole 14 and returns to the surface. Returning borehole fluid 24 includes drilling mud, and may include formation fluids that enter into the borehole 14 during the drilling process and/or rock cuttings produced by the drill bit 20 during drilling.

The system 10 may includes any number of downhole tools 26 for various processes including formation drilling, geosteering, and measurement devices for measuring versus depth and/or time one or more physical quantities in or around a borehole.

The downhole tool 26, drilling assembly 18 and/or other downhole components are configured to communicate with a processor to receive, measure and/or estimate characteristics of the downhole components, borehole and/or the formation. For example, the tool 26 is equipped with transmission equipment to communicate with a processor such as a downhole processor 28 or a surface processing unit 30. Such transmission equipment may take any desired form, and different transmission media and connections may be used. Examples of connections include wired, fiber optic, acoustic, wireless connections and mud pulse telemetry.

The surface equipment 22 and/or downhole components, in this embodiment, include one or more devices for measuring properties of the returning borehole fluid 24 and formation fluid therein. Formation fluid may include water, cuttings, oil, gas and any other material that is circulated into the borehole 14 from the surrounding formation.

For example, the surface processing unit 30 includes or is connected to a borehole fluid analysis unit or system 32 that performs measurements of borehole fluid. The borehole fluid analysis system 32 can include various devices such as a mass spectrometer and/or gas chromatography test device to determine the amount or volume of hydrocarbon and non-hydrocarbon fluids in the borehole fluid. The system 10 can also include a cuttings analysis system for measuring relative amounts of minerals and other formation materials in the cuttings. The analysis system 32 can be run periodically or continuously during drilling. In addition to, or alternatively, formation fluid measurement may be performed using one or more downhole components. For example, the tool 26 includes a sampling unit that directs fluid to a downhole measurement device.

A processing device or processor such as the surface processing unit 30 may be configured to receive data from the tool 26 and/or fluid analysis system 32 to generate formation parameter information including formation fluid measurement data. In one embodiment, the surface processing unit 30 is configured as a surface control unit which controls various drilling parameters such as rotary speed, weight-on-bit, drilling fluid flow parameters and others. The surface processing unit 30 can be configured as a surface control unit for controlling operational parameters of any energy industry operation, such as a wireline operation, a measurement operation, a production operation and/or a stimulation operation.

One method of performing measurements of borehole fluid (e.g., fluid returned to the surface) is referred to herein as "mud logging." It is noted that "mud logging" is not intended to denote measurements of a particular type of fluid or material, but may be applicable to performing measurements and deriving information from any material found in borehole fluid. Mud logging may include data identifying fluid constituents in the form of, e.g., gas logs, and may also include property data such as porosity and/or permeability logs.

Referring to FIG. 2, in one embodiment, the system 10 includes an acoustic measurement system for acoustic measurement or imaging of the formation 16 and estimating properties of fractures in a region of the formation surrounding the borehole. For example, the borehole string 12 includes an acoustic measurement tool 34 having acoustic monopole and/or multipole transmitters 36 (e.g., dipole transmitters) that emit acoustic energy pulses that typically travel radially outwardly from the transmitters 36. One or more acoustic receivers 38, such as an axial array of multipole receivers 38, are positioned along the tool 34. The transmitters 36 in this embodiment are configured to emit measurement signals in a direction generally orthogonal from the axis of the tool 34 and the borehole 14, which is referred to herein as a lateral direction.

In one embodiment, the tool 34 and a processing device such as the surface processing unit 30 are configured to perform deep shear wave imaging (DSWI). DSWI uses data generated from the cross-dipole sources, and a processing technique that uses shear body waves that radiate into the formation and are reflected by reflective boundaries in the formation. "Reflective boundaries" refer to any feature or characteristic that causes the shear body waves to reflect back toward the receivers. Exemplary reflective boundaries include bedding planes or facies boundaries, areas having different amounts of hydrocarbons, natural and/or stimulated fractures and other reflective features with acoustic impedance contrast.

A region around a borehole can be described as including a near-field region and a far-field region. A near-field region includes the surface of a borehole and may extend laterally into the formation, e.g., about 1-2 inches into the formation. The far-field region extends laterally a further distance, and thus encompasses a larger volume around the borehole. DWSI signals can be propagated into the far-field region, which can extend typically tens of feet away from the borehole and may extend, e.g., up to about 100 feet or more). The effective imaging range is a function of the signal to noise present in the data, the length of the recording time and the angle of incidence between the borehole and the reflector. The anisotropy and azimuth can be used to estimate the location, intensity and strike (azimuth) of reflective boundaries. This information can be used to estimate characteristics of the formation, including properties of fractures in the formation.

In one embodiment, a processing device such as the surface processing unit 30 or a remote processor is configured to perform aspects of a formation evaluation method that includes acquiring and analyzing both DSWI data and formation fluid data to identify and evaluate fracture systems in a formation. The method discussed herein may be performed exclusively by the processing device, or in conjunction with a human operator. It is noted that the surface processing unit 30 is only one example of a suitable processing device.

The method includes acquiring both acoustic measurement data such as DSWI data and borehole fluid measurement data to determine properties of fractures and/or fracture networks in a formation. Such properties include, for example, the extent (e.g., length) intensity (e.g., fracture width or how open is the fracture) and density of fractures in a fracture network. In one embodiment, the DSWI data is analyzed to identify and/or evaluate properties of fractures in a far-field region of the formation. The borehole fluid data is analyzed to identify fractures and/or estimate fracture and fluid properties in a near-field region, which includes the borehole wall or surface and may also extend laterally into the formation.

In one embodiment, the DSWI data is analyzed to identify and/or analyze fractures in the far-field, and properties of borehole fluid are analyzed to determine whether fractures exist in the near-field (e.g., at the borehole) and/or whether such fractures are connected to the far-field fracture network. Properties of borehole fluid can be analyzed in combination with DSWI data to determine whether open or partially open fractures, including hydrocarbon or water bearing natural fractures and/or stimulated fractures, occur only within the near-field environment, or are potentially connected to a far-field natural or stimulated fracture system. Determining the connectivity between far-field fracture networks and the borehole can be used for various purposes, including identifying regions amenable to stimulation and planning operational parameters of stimulation operations (types of fluids fluid volumes, volume rate, types of proppants, types of stimulation chemicals, etc.).

The DSWI data can be used to estimate properties of various types of fracture systems, the presence and type of fluid and properties of minerals, cements and other materials in the formation. For example, the DSWI data can be used to identify natural fracture sets within the subsurface, which can occur as the result of fluid events associated with either tectonic stresses (compression, extension, or trans-compression/trans-extension or shear) or as a result of system fluid and/or gas pressures associated with hydrocarbon generation (e.g., catagenesis of kerogens through metagenesis of kerogens, bitumens and hydrocarbons).

In addition, the DSWI data can be used to determine fracture fluid (hydrocarbon or water) and/or gas flow attributes within conventional, as well as unconventional and or complex reservoirs. The fracture fluid attributes can be divided into three primary fluid/gas flow mechanics types. These types are open (water or hydrocarbon fluid/gas bearing) fractures, partially open (e.g., partially cemented fractures with diagenetic cements, and closed (e.g., fully cemented with diagenetic cements).

Fractures that can be evaluated may also occur due to downhole operations such as drilling and stimulation operations. For example, drilling environments can result in high pressures in a borehole, which can lead to high differential pressure between the borehole and a surrounding formation, resulting in the creation or opening of fractures. These drilling induced open fractures can be developed within specific pre-existing natural fracture sets (e.g., developed within a prior tectonic induced fluid stress system), weak bedding surfaces, and or within sections of the borehole that exhibit specific weak geomechanical failure properties/attributes. Hydrocarbon over-pressured (hydrocarbon generation origin geopressure) unconventional reservoir targets (e.g., kerogen rich hydrocarbon source rocks with producible intra kerogen porosity systems) can provide another type of internal system stress in association with the existing tectonic stress regime that can make the interval close to the reservoir target fracture gradient and thus susceptible to drilling induced fracture development.

The DSWI data and/or the formation fluid data can also be used (individually or in combination) to determine the existence, type and amount of natural fracture fill cements. Such cements are often associated with a fracture fluid event and occur as early diagenetic/precipitated cements that are associated with the original fluid composition of the fluid system stress event. Depending upon the fluid chemistry of the fluid event within a specific sedimentary unit (e.g., carbonate, siliclastic), these fracture fills can be simple mineral cement fill types such as calcite. However, specific sequences of different mineral type cements (dependent upon the specific basin tectonic, thermal and/or hydrocarbon history), can occur and affect the fracture fill system. Complex or multiple fluid/hydrocarbon charge histories can also result within overlapping, multiple sets (differential azimuths to system stresses) of specific types of fractures (e.g., compressional, extensional, trans-extensional) and can include processes of secondary porosity (open fracture) development as well as specific re-precipitation of cements and/or inclusion of hydrocarbon components that inhibit additional cementation (closure mineral fill of fractures). Within complex reservoirs, ten or more multiple sequential mineral type cements can occur within a specific basin fluid charge history sequence. Complex cement sequences can develops within a crack seal natural fracture system based upon long term tectonic stresses that slowly develop open fractures. Estimation of the types of formation fluids and properties of fracture fill systems can be accomplished using the DSWI data and/or formation fluid measurement data, and can be enhanced with other formation knowledge.

In one embodiment, the method is used to identify natural and/or critically stressed fractures in the far-field region, estimate properties of one or more critically stressed fractures, and combine this analysis with formation fluid measurement data to provide a description of the fracture network around the borehole. Critically stressed fractures are fractures that are favorably oriented to fail in shear under stress conditions at the time of measurement. Examples of critically stressed fractures are shown in FIG. 3.

Figure 3:
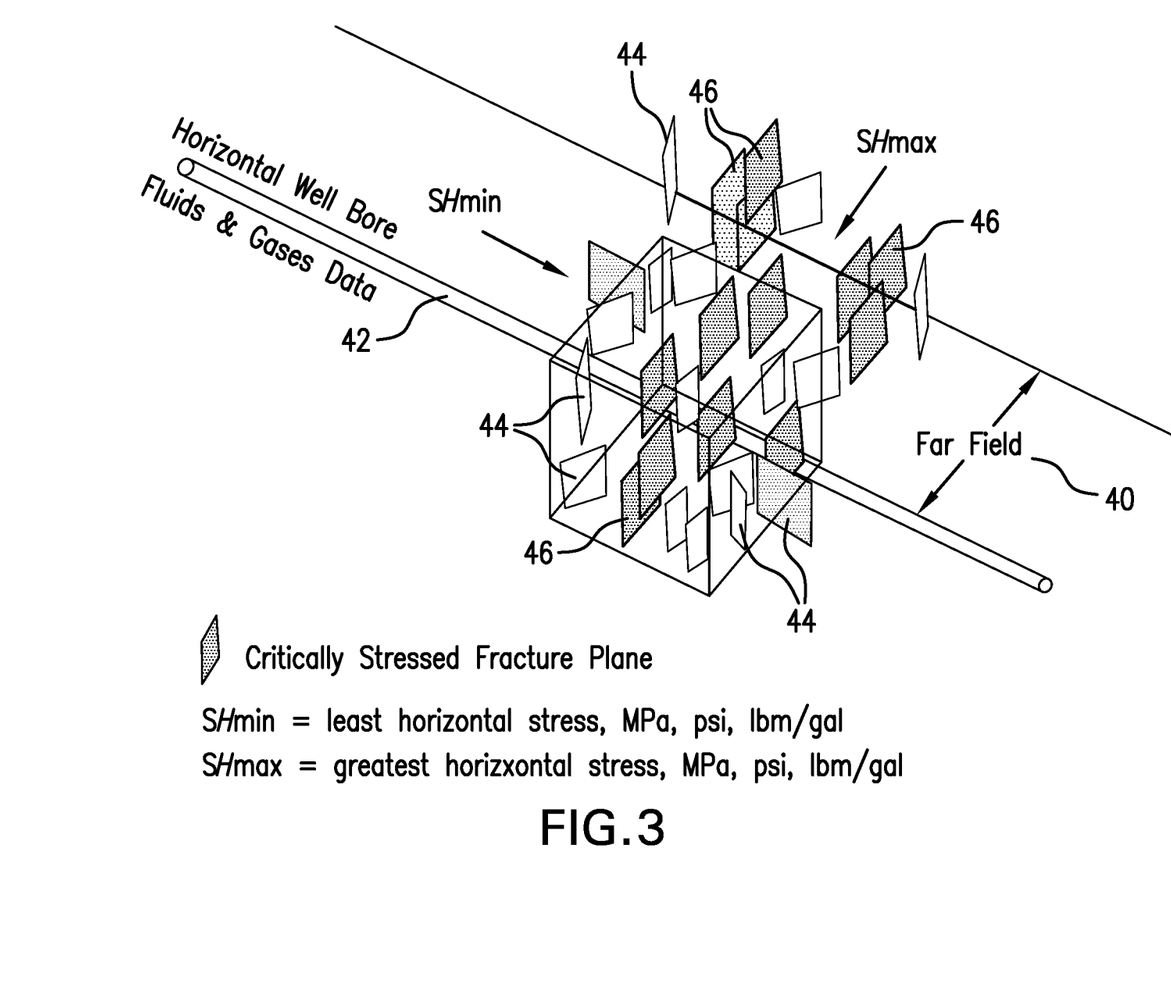
FIG. 3 depicts examples of critically stressed fractures in a formation.

FIG. 3 shows various planes representing fractures in a far-field region 40 of a formation surrounding a borehole 42. In this example, light-colored planes 44 represent non-critically stressed fractures and dark-colored planes 46 represent critically stressed fractures. As shown, critically stressed fractures are generally oriented parallel to the direction of the greatest horizontal stress ($S_{Hmax}$). DSWI data can be analyzed to identify the presence of critically stressed (CS) fractures and estimate properties such as orientation, density and fracture fill properties.

Figure 4A:
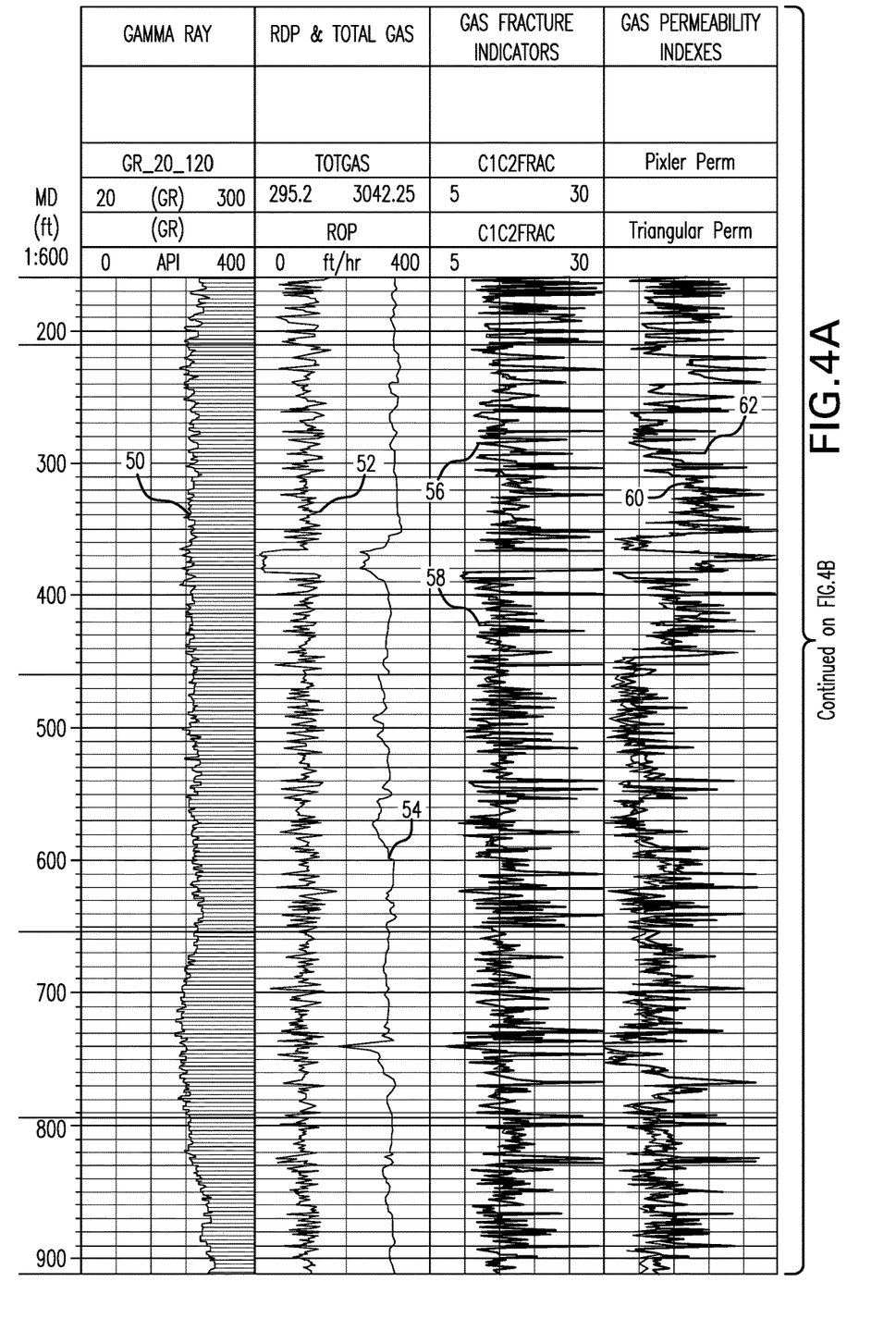
FIGS. 4A-4B collectively depict an example of acoustic measurement data and formation fluid measurement data.
Figure 4B:
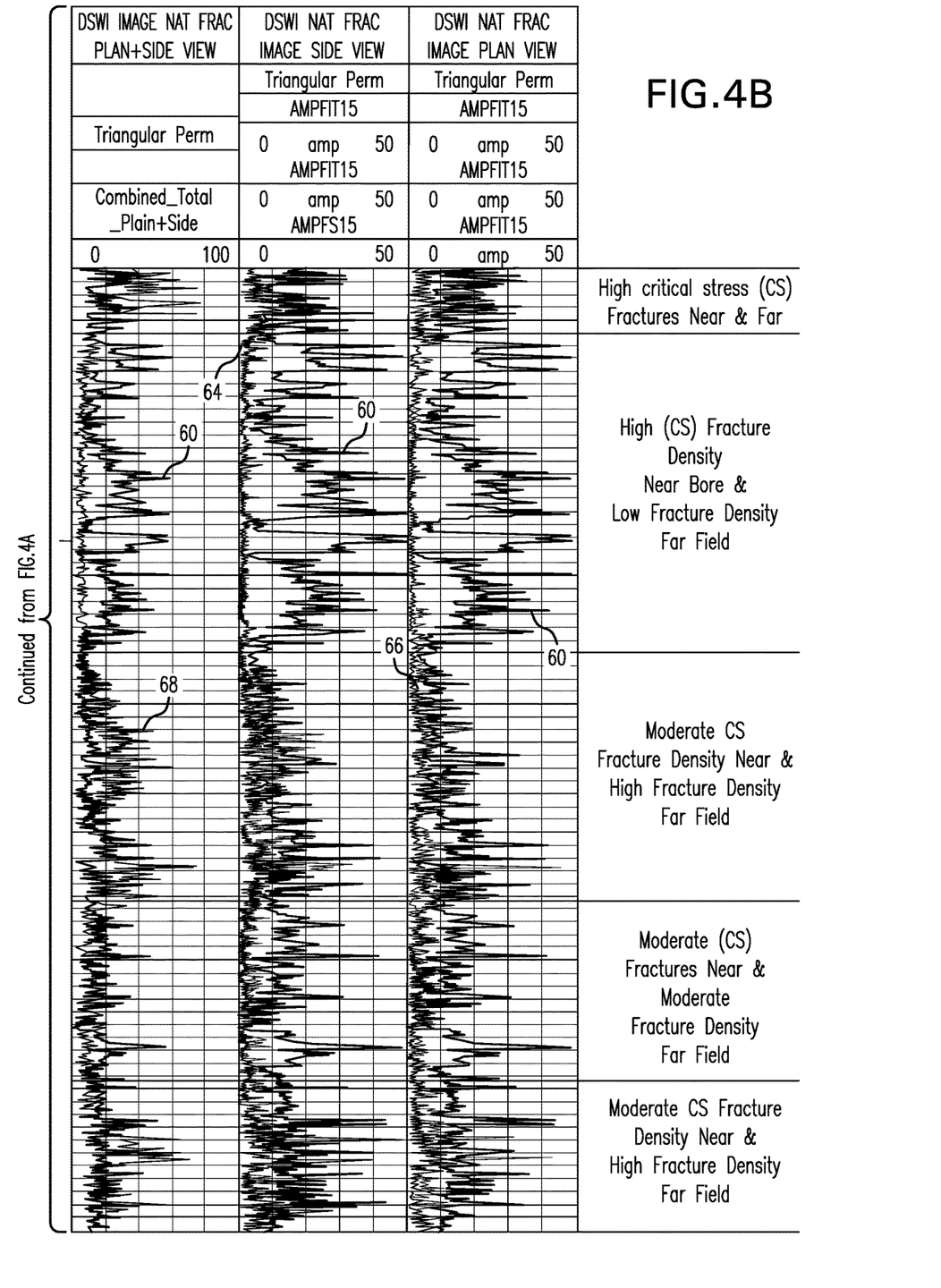

FIGS. 4A-4B collectively illustrate an example of aspects of the method based on DSWI data and formation fluid measurement data. In this example, data including logging data is acquired from measurements along a horizontal borehole section. The logging data may include various measurements such as a gamma ray log 50, drilling parameter measurements, mud log data and DSWI data. For example, drilling parameter measurements include a rate of penetration (ROP) log 52 and can include other parameter measurements such as rotational rate, weight-on-bit, mud weight and mud viscosity. The data may also include gas logs derived from chemical analysis of borehole fluid. Examples of gas logs are shown as a total gas log 54, a C1 log 56 related to amounts of methane (C1) in the borehole fluid, and a C1/C2 crossover log 58 related to amounts of methane and ethane (C2) in the borehole fluid. Other examples of gas logs include gas permeability indexes based on gas ratios such as a triangular permeability index log 60 and a Pixler permeability log 62.

The DSWI data includes reflection data from DSWI data collected in a vertical direction (plan view) and in a horizontal direction (side view). In this example, the logging data includes side view DSWI amplitude logs 64, plan view DSWI amplitude logs 66 and a combined (side view and plan view) DSWI log 68.

The combination of permeability data from the gas logs and the DSWI data provides a significant amount of information, including properties such as extent, orientation and density of fractures in the far-field based on the DSWI and near-field fracture properties based on the borehole fluid data. This information allows the processing device and/or human operator to discern sections of the formation along the borehole that are more or less conducive to stimulation and/or production. For example, the combination provides insight not only to the presence of far-field fractures (which may not intersect the borehole) but also to the potential productivity associated with the fractures. The combination also provided insight as to whether the fractures are hydrocarbon bearing or water bearing.

In the example of FIGS. 4A-4B, the DSWI data is combined to estimate properties of a fracture system around a borehole, including fluid content (e.g., water bearing, hydrocarbon fluid bearing, gas bearing, etc.), fracture density, connectivity and flow properties. As shown, the logging data can be used to classify sections of the borehole based on density and connectivity and determine which sections should be targeted for stimulation and/or production. In this example, triangular permeability values are compared to DSWI amplitudes, where high DSWI amplitudes indicate a high fracture density, and high permeability values are indicative of high near-field fracture density, high formation fluid flow rates and/or high connectivity.

For example, the combination of DSWI data and gas log data is used to identify a section (up to a measured depth (MD) of about 200 feet) having high critical stress (CS) fracture density both near-field and far-field, which can be a candidate for targeting. Another section (between about 200 feet and about 460 feet) represents high CS fracture density in the near field but low density in the far-field. As shown, two sections (between about 460 feet and 650 feet, and between about 790 feet and about 910 feet) show high density in the far-field and moderate density in the near-field, which may be good candidates for targeting.

It is noted that the specific types of data shown in FIG. 4 are not intended to be limited. Any suitable qualitative or quantitative data indicative of hydrocarbon content, flow properties and/or properties related to fracture characteristics of the formation may be used.

Figure 5:
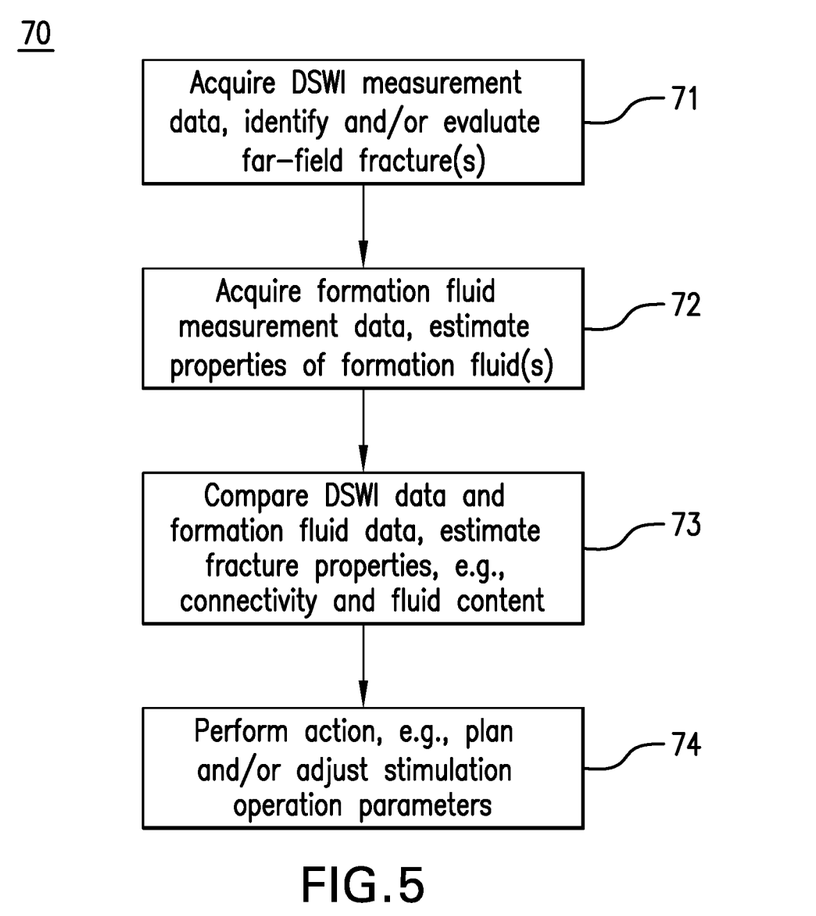
FIG. 5 is a flow diagram depicting an embodiment of a method estimating fracture properties of a formation based on acoustic measurement data and formation fluid measurement data.

FIG. 5 illustrates a method 70 of performing a downhole operation, acquiring borehole fluid and acoustic measurement data and/or estimating properties of a formation, including the existence and characteristics of fracture systems. The method 70 can be used in conjunction with the system 10 and/or the surface processing unit 30, although the method 70 may be utilized in conjunction with any suitable combination of sensing devices and processors. The method 70 may be performed entirely by the processor, in combination with other processors, and/or in combination with a human operator or user. The method 70 includes one or more stages 71-74. In one embodiment, the method 70 includes the execution of all of stages 71-74 in the order described. However, certain stages may be omitted, stages may be added, or the order of the stages changed.

In the first stage 71, DSWI data is acquired and analyzed to determine fracture properties in a formation area around a borehole. Imaging may be performed through a cased hole or an open hole. DSWI imaging is performed by running an appropriate logging tool, such as the tool 34, through a borehole (e.g., the lateral borehole section 20) and receiving reflected signals from reflective boundaries on the formation.

The DWSI data is analyzed to estimate characteristics of the formation, including identification of fractures and evaluation of properties of fractures in the far-field. In one embodiment, the data is analyzed to identify and evaluate critically stressed fractures, which can be most amenable to stimulation and production. For example, the refection amplitude of reflected signals from reflective boundaries, various characteristics of the formation including fracture properties are estimated.

In the second stage 72, borehole fluid measurement data is acquired. For example, a drill string, logging string and/or production string is disposed within a borehole in a formation and a downhole operation is performed. During the operation, drilling fluid (e.g., drilling mud) is circulated into the borehole, and borehole fluid is returned to the surface. The mud is analyzed to measure fluid properties, and the fluid properties are presented as, e.g., a mud log. Examples of fluid properties include fluid type (e.g., water, light oil, heavy oil, natural gas, etc.)

The fluid properties may be analyzed to estimate flow properties of the formation, which may be used to identify and characterize fractures. For example, fluid data is analyzed to estimate properties such as porosity and permeability, and chemical analysis is performed to determine the type of fluid to determine, e.g., whether fractures are water bearing or hydrocarbon bearing.

In the third stage 73, the borehole fluid data and the DSWI data are compared to evaluate the formation and determine the existence and extent of connectivity between the far-field fracture network and the borehole. For example, the DSWI data indicates the density of critically stressed fractures in the far-field, and the borehole fluid data indicates the amount of connectivity and may also indicate the types of fluids flowing through the fractures.

In the fourth stage 74, various actions may be performed based on the evaluation. For example, stimulation and/or production operations are planned based on the information derived from analysis of the DSWI data in combination with the formation fluid measurement data. Operational parameters such as the type and/or amount of proppant, flow rate of stimulation fluid (e.g., hydraulic fracture fluid), and pump pressure of stimulation fluid may be selected. Other operational parameters can include identifying sections along the borehole that should be produced (e.g., sections having hydrocarbon bearing fractures and at least a threshold fracture density) and sections that should be avoided (e.g., sections having water bearing fractures or having low fracture extent or density).

Embodiments described herein provide numerous advantages. The embodiments provide an effective and cost effective method of evaluating fracture characteristics and potential productivity of fracture systems. Information gained from the embodiments provides important insight into the nature of downhole fracture systems and allow for designing appropriate geo-engineered completion and stimulation strategies, e.g., stage placement, cluster placement, as well as proppant size, attribute and volume, fluid type and volume, and rate placement.

Embodiments described herein also address challenges or difficulties that arise in current exploration, evaluation and production operations. For example, data regarding formation measurements can be limited, especially in unconventional formations, which limits the ability to identify and assess fracture networks and their connectivity. Acoustic images of borehole surfaces and/or near-field regions can be extremely costly to acquire, process and interpret, and thus can often be unavailable or cost-prohibitive. Embodiments described herein address such challenges by providing cost effective techniques for evaluating fracture properties near a borehole and their connectivity to far-field fracture networks, thereby providing valuable information that may be otherwise unavailable.

Set forth below are some embodiments of the foregoing disclosure:

Embodiment 1. A method of estimating one or more properties of an earth formation, the method comprising: acquiring formation fluid data indicative of a qualitative property of a formation fluid in a near-field region of an earth formation surrounding a borehole, the near-field region including a surface of the borehole; acquiring acoustic data based on acoustic signals transmitted into a far-field region of the formation, and estimating a property of one or more fractures in the far-field region based on the acoustic data; combining the formation fluid data and the acoustic data; and estimating, by a processing device, at least one fracture property of the formation in the near-field region and the far-field region based on the combined data.

Embodiment 2. The method of any prior embodiment, further comprising performing a stimulation operation, the stimulation operation including one or more operational parameters selected based on the at least one fracture property.

Embodiment 3. The method of any prior embodiment, wherein the acoustic data is acquired using deep shear wave imaging (DSWI).

Embodiment 4. The method of any prior embodiment, wherein the at least one fracture property includes a connectivity between the one or more fractures in the far-field region and the borehole.

Embodiment 5. The method of any prior embodiment, wherein the at least one fracture property includes a characteristic of one or more critically stressed fractures in at least one of the far-field region and the near-field region.

Embodiment 6. The method of any prior embodiment, wherein the property of the formation fluid includes a permeability value derived from the formation fluid data.

Embodiment 7. The method of any prior embodiment, wherein estimating the at least one fracture property includes estimating a fracture density in the far-field region and the near-field region.

Embodiment 8. The method of any prior embodiment, wherein the property of the formation fluid includes a permeability value derived from the formation fluid data, and a fracture density in the near-field region based on the permeability value.

Embodiment 9. The method of any prior embodiment, wherein estimating the at least one fracture property includes determining whether the one or more fractures are hydrocarbon-bearing.

Embodiment 10. The method of any prior embodiment, wherein acquiring the formation fluid data includes analyzing borehole fluid circulated through the borehole during drilling.

Embodiment 11. A system for estimating one or more properties of an earth formation, the system comprising: at least one acquisition unit configured to acquire formation fluid data and acoustic data, the formation fluid data indicative of a qualitative property of a formation fluid in a near-field region of an earth formation surrounding a borehole, the near-field region including a surface of the borehole, the acoustic data based on acoustic signals transmitted into a far-field region of the formation; and a processing device configured to perform: estimating a property of one or more fractures in the far-field region based on the acoustic data; combining the formation fluid data and the acoustic data; and estimating at least one fracture property of the formation in the near-field region and the far-field region based on the combined data.

Embodiment 12. The system of any prior embodiment, further comprising a system for performing a stimulation operation, the stimulation operation including one or more operational parameters selected based on the at least one fracture property.

Embodiment 13. The system of any prior embodiment, wherein the acoustic data is acquired using deep shear wave imaging (DSWI).

Embodiment 14. The system of any prior embodiment, wherein the at least one fracture property includes a connectivity between the one or more fractures in the far-field region and the borehole.

Embodiment 15. The system of any prior embodiment, wherein the at least one fracture property includes a characteristic of one or more critically stressed fractures in at least one of the far-field region and the near-field region.

Embodiment 16. The system of any prior embodiment, wherein the property of the formation fluid includes a permeability value derived from the formation fluid data.

Embodiment 17. The system of any prior embodiment, wherein estimating the at least one fracture property includes estimating a fracture density in the far-field region and the near-field region.

Embodiment 18. The system of any prior embodiment, wherein the property of the formation fluid includes a permeability value derived from the formation fluid data, and a fracture density in the near-field region based on the permeability value.

Embodiment 19. The system of any prior embodiment, wherein estimating the at least one fracture property includes determining whether the one or more fractures are hydrocarbon-bearing.

Embodiment 20. The system of any prior embodiment, wherein acquiring the formation fluid data includes analyzing borehole fluid circulated through the borehole during drilling.

Generally, some of the teachings herein are reduced to an algorithm that is stored on machine-readable media. The algorithm is implemented by a computer and provides operators with desired output.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of estimating one or more properties of an earth formation, the method comprising:
   performing a measurement of fluid from a borehole, and acquiring formation fluid data based on the measurement, the formation fluid data indicative of a qualitative property of a formation fluid in a near-field region of an earth formation surrounding the borehole, the near-field region including a surface of the borehole;
   acquiring acoustic data based on acoustic signals transmitted into a far-field region of the formation, and estimating a property of one or more fractures in the far-field region based on the acoustic data;
   combining the formation fluid data and the acoustic data; and
   estimating, by a processing device, at least one fracture property of the formation in the near-field region and the far-field region based on the combined data.

2. The method of claim 1, further comprising performing a stimulation operation, the stimulation operation including one or more operational parameters selected based on the at least one fracture property.

3. The method of claim 1, wherein the acoustic data is acquired using deep shear wave imaging (DSWI).

4. The method of claim 1, wherein the at least one fracture property includes a connectivity between the one or more fractures in the far-field region and the borehole.

5. The method of claim 1, wherein the at least one fracture property includes a characteristic of one or more critically stressed fractures in at least one of the far-field region and the near-field region.

6. The method of claim 1, wherein the property of the formation fluid includes a permeability value derived from the formation fluid data.

7. The method of claim 1, wherein estimating the at least one fracture property includes estimating a fracture density in the far-field region and the near-field region.

8. The method of claim 7, wherein the property of the formation fluid includes a permeability value derived from the formation fluid data, and a fracture density in the near-field region based on the permeability value.

9. The method of claim 1, wherein estimating the at least one fracture property includes determining whether the one or more fractures are hydrocarbon-bearing.

10. The method of claim 1, wherein acquiring the formation fluid data includes analyzing borehole fluid circulated through the borehole during drilling.

11. A system for estimating one or more properties of an earth formation, the system comprising:
    a measurement device configured to perform a measurement of fluid from a borehole, and generate formation fluid data based on the measurement;
    at least one acquisition unit configured to acquire formation fluid data and acoustic data, the formation fluid data indicative of a qualitative property of a formation fluid in a near-field region of an earth formation surrounding the borehole, the near-field region including a surface of the borehole, the acoustic data based on acoustic signals transmitted into a far-field region of the formation; and
    a processing device configured to perform:
    estimating a property of one or more fractures in the far-field region based on the acoustic data;
    combining the formation fluid data and the acoustic data; and
    estimating at least one fracture property of the formation in the near-field region and the far-field region based on the combined data.

12. The system of claim 11, further comprising a system for performing a stimulation operation, the stimulation operation including one or more operational parameters selected based on the at least one fracture property.

13. The system of claim 11, wherein the acoustic data is acquired using deep shear wave imaging (DSWI).

14. The system of claim 11, wherein the at least one fracture property includes a connectivity between the one or more fractures in the far-field region and the borehole.

15. The system of claim 11, wherein the at least one fracture property includes a characteristic of one or more critically stressed fractures in at least one of the far-field region and the near-field region.

16. The system of claim 11, wherein the property of the formation fluid includes a permeability value derived from the formation fluid data.

17. The system of claim 11, wherein estimating the at least one fracture property includes estimating a fracture density in the far-field region and the near-field region.

18. The system of claim 17, wherein the property of the formation fluid includes a permeability value derived from the formation fluid data, and a fracture density in the near-field region based on the permeability value.

19. The system of claim 11, wherein estimating the at least one fracture property includes determining whether the one or more fractures are hydrocarbon-bearing.

20. The system of claim 11, wherein acquiring the formation fluid data includes analyzing borehole fluid circulated through the borehole during drilling.

* * * * *